United States Patent
Kikuchi et al.

(10) Patent No.: US 8,498,021 B2
(45) Date of Patent: Jul. 30, 2013

(54) IMAGE PROCESSING APPARATUS AND IMAGE FORMING APPARATUS CONFIGURED TO CALCULATE A MISREGISTRATION AMOUNT

(75) Inventors: Michio Kikuchi, Kanagawa (JP);
Yasuyuki Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 992 days.

(21) Appl. No.: 12/556,290

(22) Filed: Sep. 9, 2009

(65) Prior Publication Data
US 2010/0245921 A1 Sep. 30, 2010

(30) Foreign Application Priority Data

Mar. 26, 2009 (JP) ................................. 2009-077529

(51) Int. Cl.
| | |
|---|---|
| G06T 5/00 | (2006.01) |
| G06K 15/00 | (2006.01) |
| G06K 9/64 | (2006.01) |
| G06F 15/00 | (2006.01) |
| H04N 1/46 | (2006.01) |
| B41J 2/385 | (2006.01) |
| B41J 2/47 | (2006.01) |
| G03G 15/01 | (2006.01) |

(52) U.S. Cl.
USPC ......... 358/3.26; 358/1.18; 358/504; 358/540; 358/1.9; 347/115; 347/116; 347/232; 399/301; 382/279

(58) Field of Classification Search
None
See application file for complete search history.

(56) References Cited

U.S. PATENT DOCUMENTS

| | | | | |
|---|---|---|---|---|
| 5,495,535 | A | * | 2/1996 | Smilansky et al. ............ 382/145 |
| 5,500,746 | A | * | 3/1996 | Aida .............................. 358/518 |
| 5,615,314 | A | * | 3/1997 | Schoenzeit et al. ........... 358/1.15 |
| 6,959,385 | B2 | * | 10/2005 | Murakami et al. ............. 713/176 |
| 8,159,718 | B2 | * | 4/2012 | Misawa .......................... 358/2.1 |
| 2003/0197877 | A1 | * | 10/2003 | Lee ................................ 358/1.9 |
| 2007/0242986 | A1 | * | 10/2007 | Matsuyama et al. ........... 399/301 |
| 2008/0240754 | A1 | * | 10/2008 | Kobayashi et al. .............. 399/46 |
| 2009/0003893 | A1 | * | 1/2009 | Nishikawa et al. ............. 399/301 |
| 2009/0074438 | A1 | * | 3/2009 | Kawada et al. .................. 399/51 |
| 2009/0196636 | A1 | * | 8/2009 | Miyadera ........................ 399/39 |

FOREIGN PATENT DOCUMENTS

| | | |
|---|---|---|
| JP | A-08-286523 | 11/1996 |
| JP | A-2002-139880 | 5/2002 |
| JP | A-2003-131468 | 5/2003 |
| JP | A-2007-033550 | 2/2007 |

* cited by examiner

*Primary Examiner* — Hilina S Kassa
(74) *Attorney, Agent, or Firm* — Oliff & Berridge, PLC

(57) ABSTRACT

An image processing apparatus includes: a controller that causes an image forming unit to form an image so that a plurality of unit images are arranged in a first direction with a constant distance between adjacent unit images; an acquisition unit that acquires read image data indicating a position and a grey level value of each pixel constituting the image formed under control of the controller; and a calculation unit that calculates a misregistration with respect to the first direction of the image formed by the image forming unit, based on a convolution operation performed on the read image data acquired by the acquisition unit, the convolution operation using a reference periodic function whose variable is a position in the first direction.

8 Claims, 7 Drawing Sheets

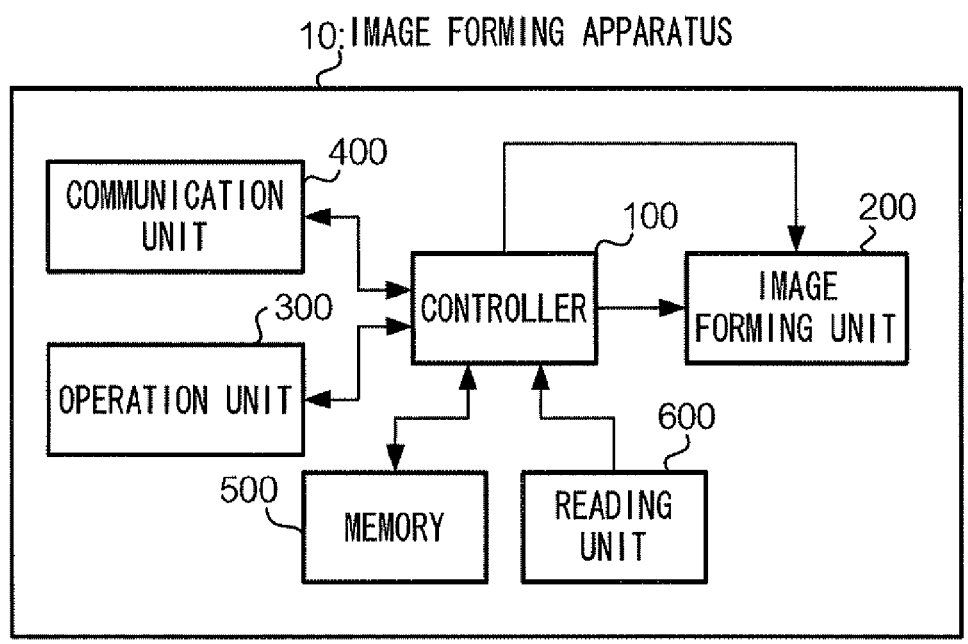
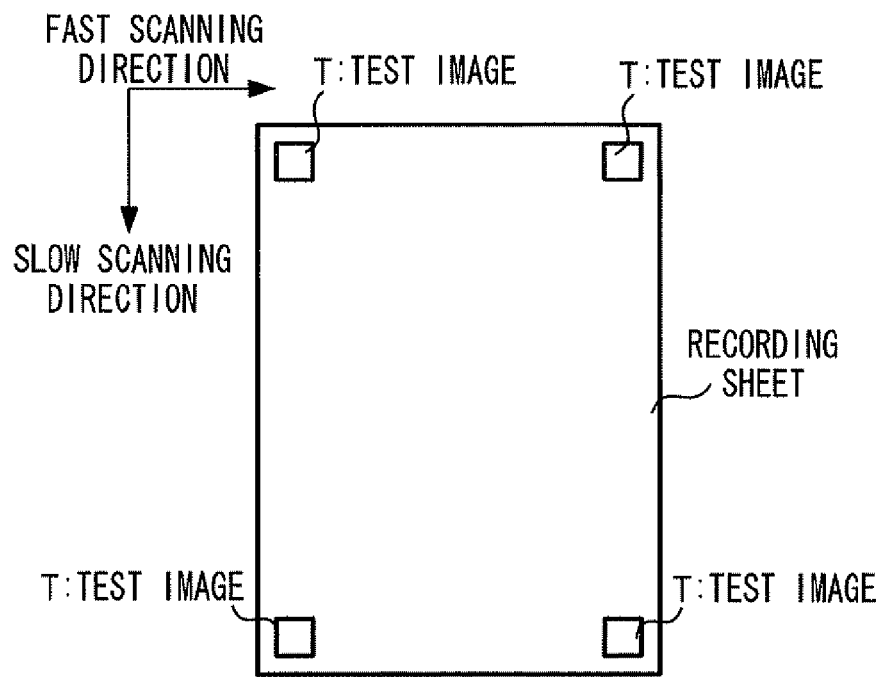

IMAGE PROCESSING APPARATUS AND IMAGE FORMING APPARATUS CONFIGURED TO CALCULATE A MISREGISTRATION AMOUNT

CROSS-REFERENCE TO RELATED APPLICATIONS

This application is based on and claims priority under 35 U.S.C. 119 from Japanese Patent Application No. 2009-77529, which was filed on Mar. 26, 2009.

BACKGROUND

1. Technical Field

The present invention relates to an image processing apparatus and an image forming apparatus.

2. Related Art

In image forming apparatuses, there may be occurrences of misregistration in which the formation position of an image becomes shifted.

SUMMARY

In an aspect of the invention, there is provided an image processing apparatus includes: a controller that causes an image forming unit to form an image so that a plurality of unit images are arranged in a first direction with a constant distance between adjacent unit images; an acquisition unit that acquires read image data indicating a position and a grey level value of each pixel constituting the image formed under control of the controller; and a calculation unit that calculates a misregistration with respect to the first direction of the image formed by the image forming unit, based on a convolution operation performed on the read image data acquired by the acquisition unit, the convolution operation using a reference periodic function whose variable is a position in the first direction.

BRIEF DESCRIPTION OF THE DRAWINGS

An exemplary embodiment of the present invention will be described in detail based on the following figures, wherein:

FIG. 1 is a diagram showing a configuration of an image forming apparatus according to an exemplary embodiment of the present invention;

FIG. 3 is a diagram showing the surface of a recording sheet on which a test image according to the exemplary embodiment has been formed;

DETAILED DESCRIPTION

(A) Configuration

Figure 2:
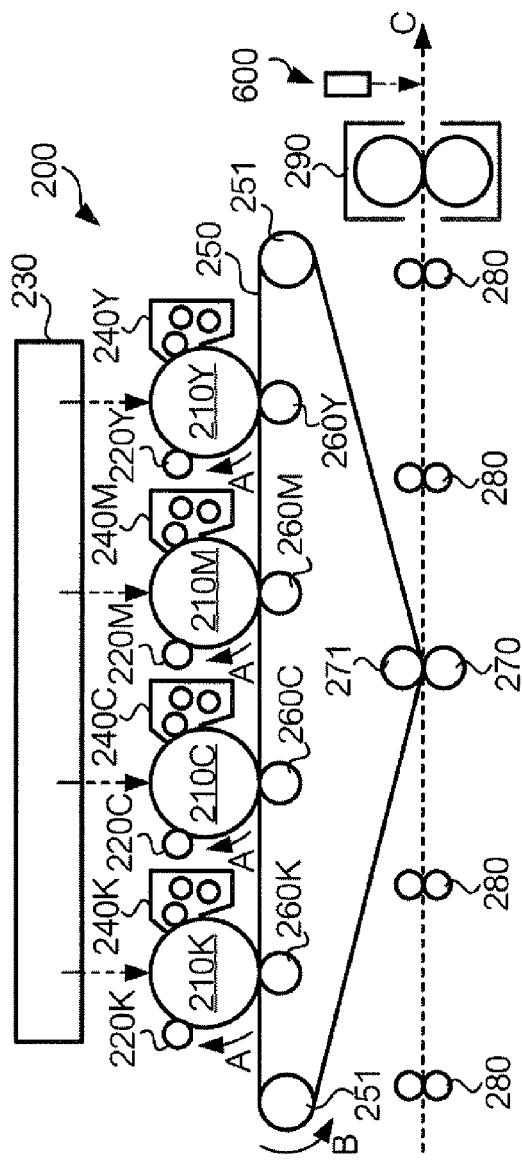
FIG. 2 is a diagram showing a configuration of an image forming unit and a reading unit according to the exemplary embodiment.

Below is a description of an exemplary embodiment of the present invention with reference to the drawings.

FIG. 1 is a block diagram showing a configuration of an electrophotographic image forming apparatus that is an exemplary embodiment of the present invention. An image forming apparatus 10 of the present exemplary embodiment includes a controller 100, an image forming unit 200, an operation unit 300, a communication unit 400, a memory 500, and a reading unit 600.

The controller 100 includes a memory and an operation device having a CPU (Central Processing Unit) and an ASIC (Application Specific Integrated Circuit), and the controller 100 controls units in the image forming apparatus 10. The controller 100 acquires image data from the communication unit 400 and the memory 500, performs image processing on the acquired image data, and supplies the processed image data to the image forming unit 200. The image forming unit 200 is an example of the image forming unit of the present invention, and the image forming unit 200 forms an image onto a recording sheet in accordance with received image data. The image forming unit 200 is, for example, a printer that forms images by an electrophotographic process, and the image forming unit 200 performs charging, exposure, image developing, transfer, fixing, and the like. The image forming unit 200 forms an image onto a recording sheet with use of four colors of toner, namely yellow (Y), magenta (M), cyan (C), and black (K). Note that the toner used by the image forming unit 200 is an example of the colorant of the present invention.

The operation unit 300 includes operators such as buttons, and the operation unit 300 supplies the controller 100 with operation information indicating operation content in accordance with user operations. The communication unit 400 includes an interface for the transmission and reception of data with an external apparatus, and the communication unit 400 acquires image data that has been received from, for example, an external apparatus 1000 shown in FIG. 3. The memory 500 includes a storage device such as an HDD (Hard Disk Drive), and the memory 500 stores, for example, received image data that is for forming an image, and test image data that is described later. The reading unit 600 is an example of the reading unit of the present invention, and the reading unit 600 optically reads the surface of a recording sheet and generates image data expressing the read image.

FIG. 2 is a diagram showing a configuration of the image forming unit 200 and the reading unit 600.

As shown in FIG. 2, the image forming unit 200 includes photosensitive drums 210Y, 210M, 210C, and 210K; charging devices 220Y, 220M, 220C, and 220K; an exposing device 230; developing devices 240Y, 240M, 240C, and 240K; an intermediate transfer belt 250; multiple rotation rollers 251; primary transfer rollers 260Y, 260M, 260C, and 260K; a secondary transfer roller 270; a backup roller 271; multiple transporting rollers 280; and a fixing device 290.

Note that the reference characters of members in the image forming unit 200 that have a letter (Y, M, C, or K) at the end indicate configurations relating to image formation using the color corresponding to the letter. Members indicated by reference characters that differ only with respect to the ending letter are located at different positions and use different toner, but have the same configuration. It should also be noted that the ending letters are omitted from reference characters in the description when there is no particular need to distinguish between the various configurations.

A recording sheet that is to be transported in the image forming unit 200 is transported in the direction of the broken-line arrow C shown in FIG. 2, and an image is formed on this recording sheet.

The photosensitive drums 210 are cylindrical members whose surfaces have a photoconductive film formed thereon. While in contact with the intermediate transfer belt 250, the photosensitive drums 210 rotate in the direction of the arrow A in FIG. 2 in accordance with the movement of the intermediate transfer belt 250, with the axis of rotation being the center of the cylinder. The charging devices 220 build up a given potential on the photoconductive film of the photosensitive drums 210. The exposing device 230 irradiates light onto the charged photosensitive drums 210 (i.e., performs exposure), thus forming an electrostatic latent image in accordance with the exposure light. The exposure intensity and exposure position are controlled by the controller 100. Note that the scanning direction of the exposure light from the exposing device 230 is the same as the axis direction of the photosensitive drums 210 (a direction perpendicular to the sheet plane in FIG. 2). In the present exemplary embodiment, this axis direction is considered to be the fast scanning direction of the image forming unit 200, and hereinafter is simply called the "fast scanning direction". Also, the direction orthogonal to the fast scanning direction is considered to be the slow scanning direction of the image forming unit 200, and hereinafter is simply called the "slow scanning direction". Note that the fast scanning direction is an example of the first direction of the present invention, and the slow scanning direction is an example of the second direction of the present invention.

The developing devices 240 have a developing agent that is a mixture of toner and a carrier, and each developing device 240 develops, with use of the toner, an electrostatic latent image that has been formed on the corresponding photosensitive drum 210. Each developing device 240 generates a potential difference between itself and the corresponding photosensitive drum 210, and with use of the potential difference, causes charged toner to move to the surface of the photosensitive drum 210.

The intermediate transfer belt 250 is an endless belt-shaped member, and the intermediate transfer belt 250 rotates in the direction of the arrow B in FIG. 2 while in contact with the rotation rollers 251, the primary transfer rollers 260, and the backup roller 271. The rotation rollers 251 are cylindrical members that support the movement of the intermediate transfer belt 250, and the axis of rotation for each rotation roller 251 is the center of the cylinder. Some of the rotation rollers 251 rotate due to a driving unit, and some of the rotation rollers 251 rotate along with the movement of the intermediate transfer belt 250. The primary transfer rollers 260 are cylindrical members disposed in opposition to corresponding photosensitive drums 210 so as to sandwich the intermediate transfer belt 250 therebetween. Each primary transfer roller 260 generates a potential difference between itself and the corresponding photosensitive drum 210 to transfer toner on the surface of the photosensitive drum 210 to the surface of the intermediate transfer belt 250. The secondary transfer roller 270 is a cylindrical member disposed in opposition to the backup roller 271 so as to sandwich the intermediate transfer belt 250 therebetween. The second transfer roller 270 generates a potential difference between itself and the backup roller 271 to transfer toner on the surface of the intermediate transfer belt 250 to the surface of a recording sheet at the transfer position. The transporting rollers 280 are cylindrical members that transport a sheet to a position at which the secondary transfer roller 270 performs transfer, and transport a sheet to which toner has been transferred to the position at which the fixing device 290 has been provided. The fixing device 290 applies heat and pressure to the sheet to which toner has been transferred, thus fixing the toner to the sheet.

The reading unit 600 is provided at a position for reading a recording sheet that is farther downstream than the fixing device 290 in the recording sheet transporting direction (the direction of the arrow C). In other words, the reading unit 600 reads the surface of a recording sheet after an image has been fixed by the fixing device 290. The reading unit 600 includes a light source, an imaging lens, a line sensor, and a signal processing circuit, and the reading unit 600 reads the surface of a recording sheet at a resolution of, for example, 200 dpi (dots per inch). The light source is, for example, a fluorescent lamp, and the light source irradiates light onto a transported recording sheet. The imaging lens causes reflected light from the recording sheet to form an image at the position of the line sensor. The line sensor receives the image-forming light and generates an image signal in accordance with the light. The line sensor includes an imaging element that captures images in 3 colors, namely R (red), G (green), and B (blue), and the line sensor generates image signals for these three colors. The signal processing circuit performs processing such as A/D conversion on image signals, generates image data constituted by 8-bit (256 grey levels) pixel data, and outputs the image data to the controller 100. Hereinafter in the description, image data that has been generated as a result of the reading unit 600 reading a recording sheet is called "read image data". The reading unit 600 generates read image data for each of the R, G, and B color components. The reading unit 600 generates read image data including pixel data that expresses a low grey level value when an image having a low density has been read, and pixel data that expresses a high grey level value when an image having a high density has been read. Note that the grey level value has a minimum value of "0" and a maximum value of "255", and the higher the grey level value, the more intense the corresponding color component is expressed.

Figure 4:
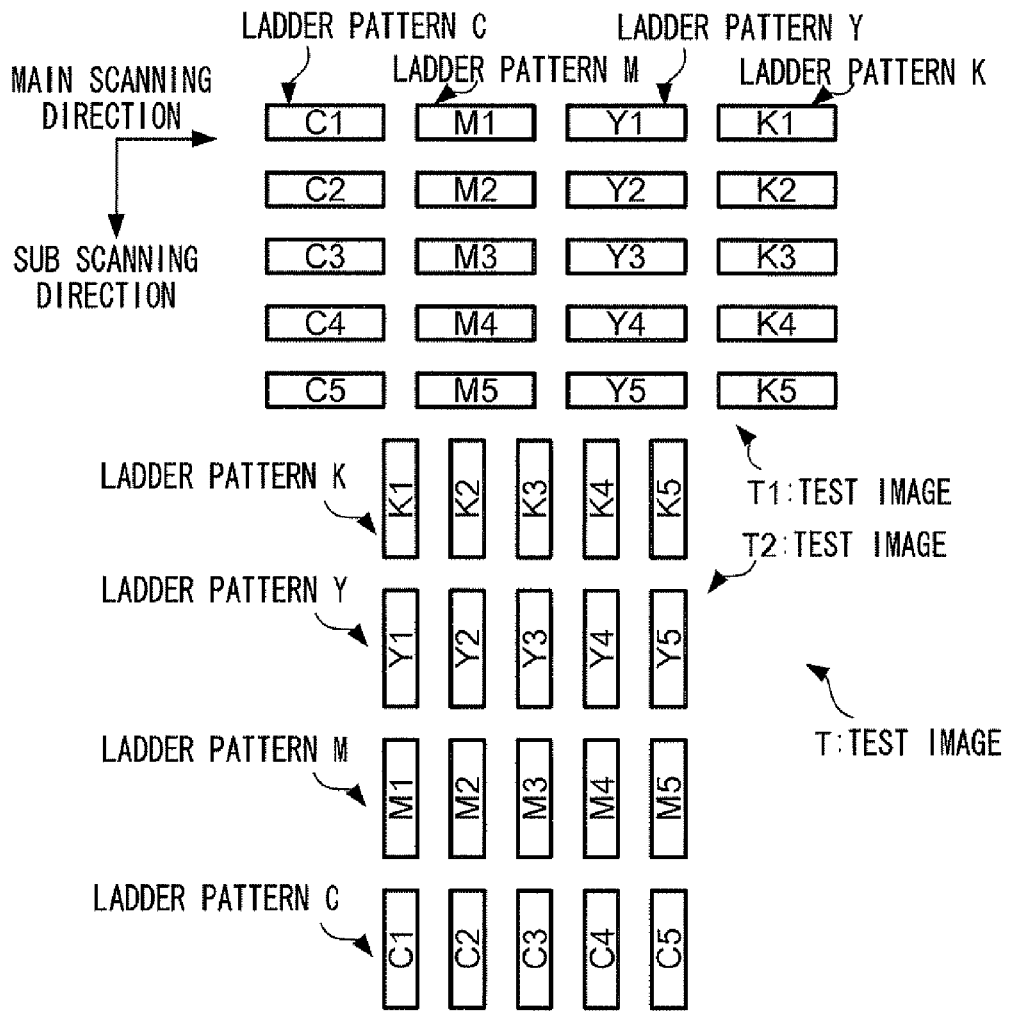
FIG. 4 is a diagram showing the test image according to the exemplary embodiment.
Figure 5:
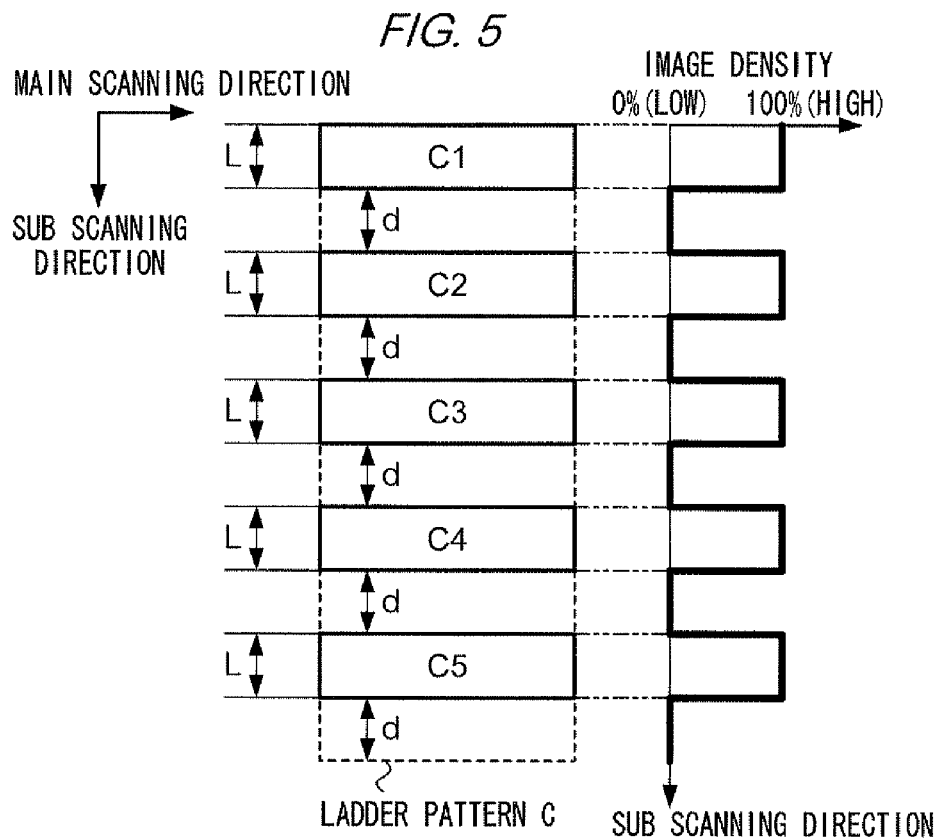
FIG. 5 is a diagram showing the test image according to the exemplary embodiment.

The following describes a test image expressed by test image data stored in the memory 500 with reference to FIGS. 3 to 5.

FIG. 3 is a diagram showing the surface of a recording sheet on which a test image T of the present exemplary embodiment has been formed. As shown in FIG. 3, the same test image T is arranged in the vicinity of the four corners of the recording sheet. FIG. 4 is a diagram showing the configuration of the test image T. As shown in FIG. 4, the test image T is composed of a test image T1 and a test image T2. The test images T1 and T2 include four types of pattern images, namely ladder patterns C, M, Y, and K, and these colors correspond to the colors of toner used by the image forming unit 200.

FIG. 5 is a diagram showing the configuration of the ladder pattern C in the test image T1, which is one of the ladder patterns included in the test image T of the present exemplary embodiment.

As shown in FIG. 5, the ladder pattern C of the test image T1 is composed of unit images C1 to C5. Each of the unit images C1 to C5 is a rectangular image having two long sides that are parallel with the fast scanning direction and two short sides that are parallel with the slow scanning direction. The rectangular image is a so-called solid image having a density (area ratio) of 100%. These unit images C1 to C5 are formed with a given distance therebetween in the slow scanning direction, with use of cyan (C) toner as the single colorant. Note that it is assumed here that L is the length of the unit images C1 to C5 in the width direction, and d is the distance between adjacent unit images. In this example, it is assumed that L=d.

Also, the right side of FIG. 5 shows the transition of density with respect to the slow scanning direction in the area in which the ladder pattern C has been formed. As can be seen in FIG. 5, the density is high (density: 100%) in the area in which the unit images C1 to C5 are arranged, and the density is low (density: 0%) in the area in which the unit images C1 to C5 are not arranged and the surface of the recording sheet is exposed. Since L=d as described above, in the area in which the ladder pattern C has been formed, the density of the recording sheet surface periodically changes in the slow scanning direction.

The test image T1 includes the ladder patterns M, Y, and K in addition to the ladder pattern C, and these ladder patterns M, Y, and K have the same configuration as the ladder pattern C, with the exception of only the color of toner and the position in the fast scanning direction. Accordingly, if the ladder pattern C in FIG. 5 is replaced with the ladder patterns M, Y, and K, the same content as above regarding the ladder pattern C can be used to describe the ladder patterns M, Y, and K. Also, as shown in FIG. 4, the C, M, Y, and K colored unit images that have the same number at the end of the reference character are arranged at the same position in the slow scanning direction. Furthermore, the test image T2 has the same configuration as the test image T1, but is rotated 90 degrees in the counterclockwise direction. In other words, the ladder patterns C, M, Y, and K of the test image T2 each include unit images that have been formed with use of a single color of toner in the fast scanning direction. Accordingly, in the area of the recording sheet in which the ladder patterns C, M, Y, and K have been formed, the density periodically changes in the fast scanning direction.

Figure 6:
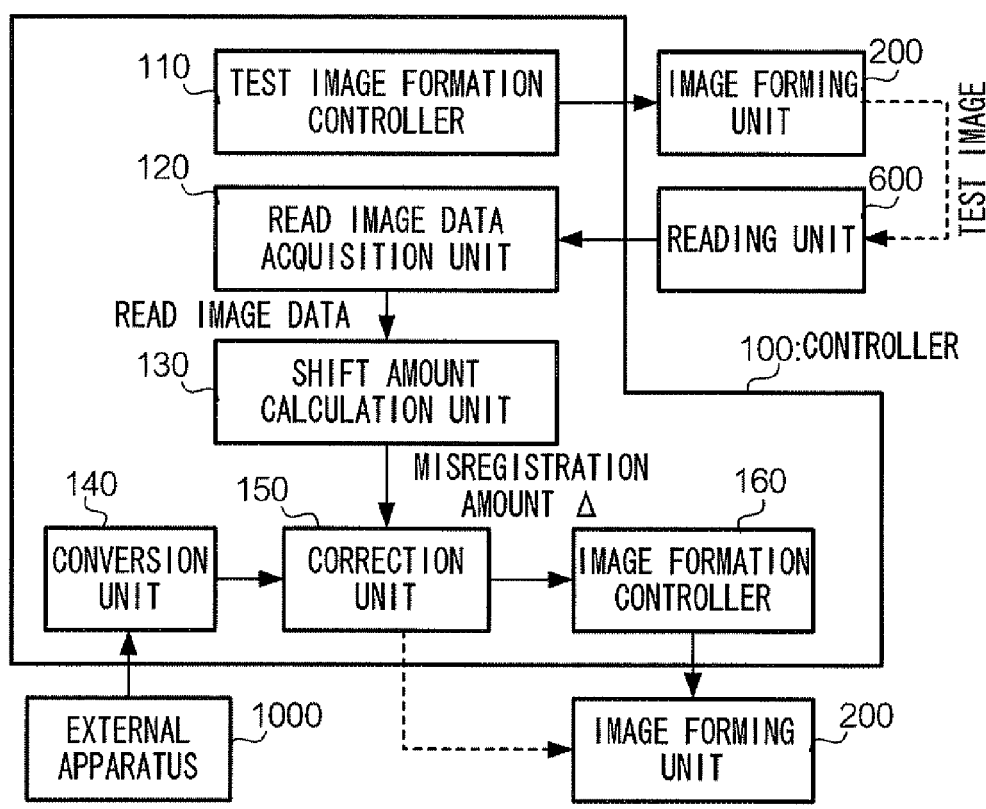
FIG. 6 is a block diagram showing an exemplary functional configuration of the image forming apparatus according to the exemplary embodiment.

FIG. 6 is a block diagram showing an exemplary functional configuration of the image forming apparatus 10.

As shown in FIG. 6, the controller 100 is realized by the functions of a test image formation controller 110, a read image data acquisition unit 120, a shift amount calculation unit 130, a conversion unit 140, a correction unit 150, and an image formation controller 160. These functions may be realized by one or more hardware circuits, may be realized by the calculation device executing one or more programs, or may be realized by a combination of these.

The test image formation controller 110 is an example of the image formation controller of the present invention, and the test image formation controller 110 supplies, to the image forming unit 200, test image data that is stored in the memory 500 and expresses the test image T shown in FIG. 4, and causes the image forming unit 200 to form the test image. In accordance with the control of the test image formation controller 110, the image forming unit 200 forms the test image T on a recording sheet, thereafter the recording sheet is transported to the reading unit 600, and the reading unit 600 reads the surface of the recording sheet and generates read image data expressing the read image. This read image data includes "read unit images" that are images corresponding to the unit images.

The read image data acquisition unit 120 is an example of the reading unit of the present invention, and the read image data acquisition unit 120 acquires read image data for the R, G, and B color components from the reading unit 600, and supplies the acquired read image data to the shift amount calculation unit 130.

Figure 7A:
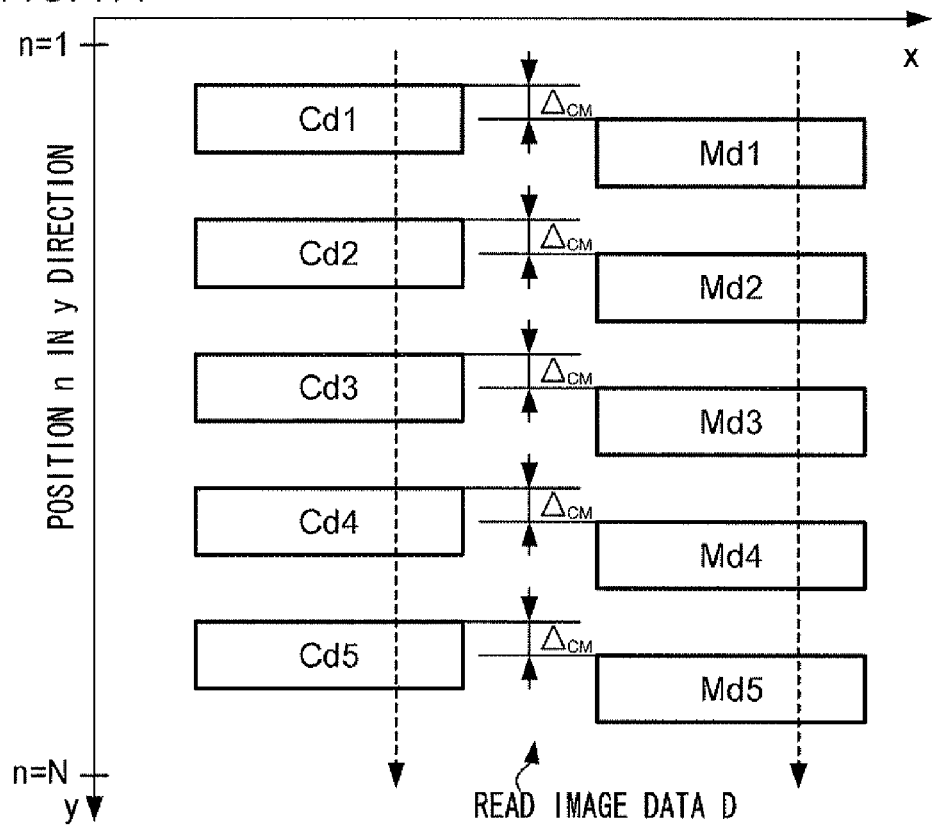
FIGS. 7A and 7B are diagrams showing exemplary images expressed by read image data according to the exemplary embodiment.
Figure 7B:
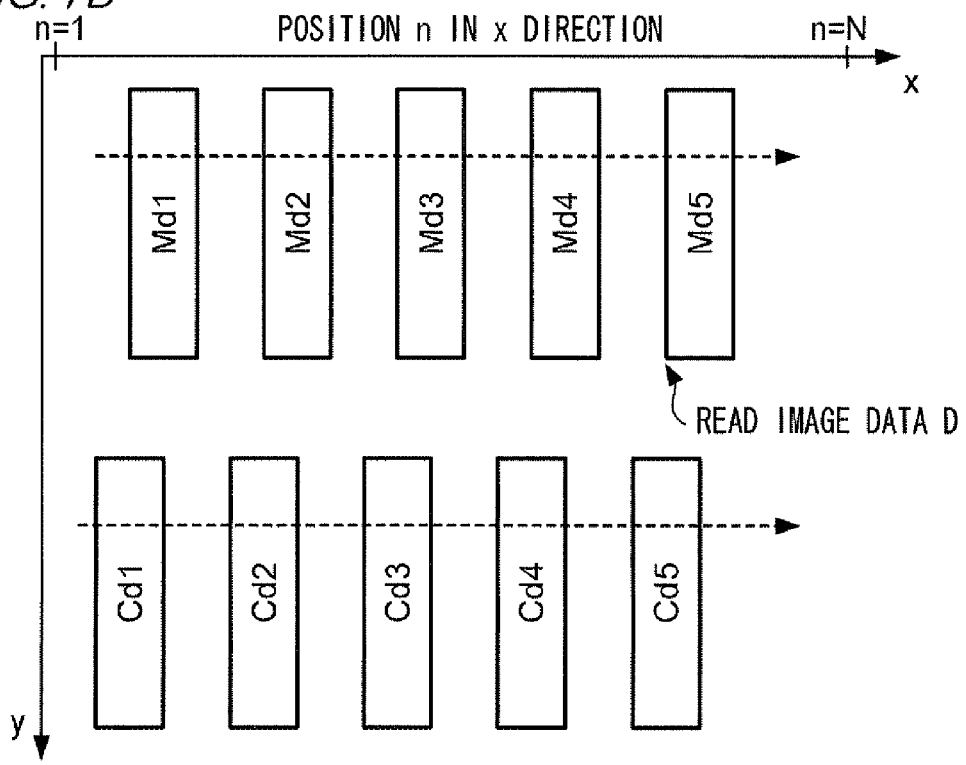

FIGS. 7A and 7B are diagrams showing exemplary images expressed by read image data that has been generated by reading the test image T. FIG. 7A is a diagram showing images corresponding to the ladder patterns C and M in the test image T1, which are among images expressed by read image data D, and FIG. 7B is a diagram showing images corresponding to the ladder patterns C and M in the test image T2, which are among images expressed by the read image data D.

As shown in FIGS. 7A and 7B, the read image data D includes, regarding the test images T1 and T2, read unit images Cd1 to Cd5 that correspond one-to-one with the unit images C1 to C5 in the ladder pattern C, and read unit images Md1 to Md5 that correspond one-to-one with the unit images M1 to M5 in the ladder pattern M. Hereinafter, it is assumed that in the read image data, the fast scanning direction is the "x direction", and the slow scanning direction is the "y direction". In the read image data, coordinate values have been assigned to each pixel in accordance with an xy orthogonal coordinate system. In FIGS. 7A and 7B, "n" is a value expressing the position of a pixel in the one of x direction and the y direction in which the unit image is aligned in the read image data. Here, "n" is a value that sets the position of each pixel in the area in which the read unit images exist. Values from n=1 to n=N (a natural number) are set for the pixels in ascending order in the direction in which the coordinate values increase. Note that the pixel to be n=1 is determined at the design stage or the like, and the value of N is determined at the design stage or the like such that all of the unit images included in at least the ladder patterns are included in the domain.

As shown in FIG. 7A, in the read image data D, the positions of the read unit images Cd1 to Cd5 are shifted by $\Delta_{CM}$ (pixels) in the y direction from the positions of the read unit images Md1 and Md5 corresponding to the test image T1. Here, $\Delta_{CM}$ is a value indicated as a number of pixels, and indicates the amount of misregistration with respect to the slow scanning direction between images formed using toner C and toner M. When misregistration amount $\Delta_{CM} \neq 0$, the image formation positions of images formed using toner C and toner M are relatively shifted in the slow scanning direction from the intended positions. This misregistration is the cause of so-called color shift. It is possible for this misregistration to occur with other colors of images in the test image T1 as well, and in the case of the test image T2, a misregistration between different colors of read unit images in the x direction means that misregistration (color shift) in the fast scanning direction has occurred. When color shift occurs, the overlapping of colors of toner turns out differently than intended, and this is a cause of image defects, image degradation, and the like. Such misregistration between different colors of images occurs due to, for example, degradation over time in the image forming apparatus 10.

Here, "density function" is defined as a function expressing the grey level values of pixels, where the variable is the position n of the pixels in the x or y direction in the read image data.

Figure 8:
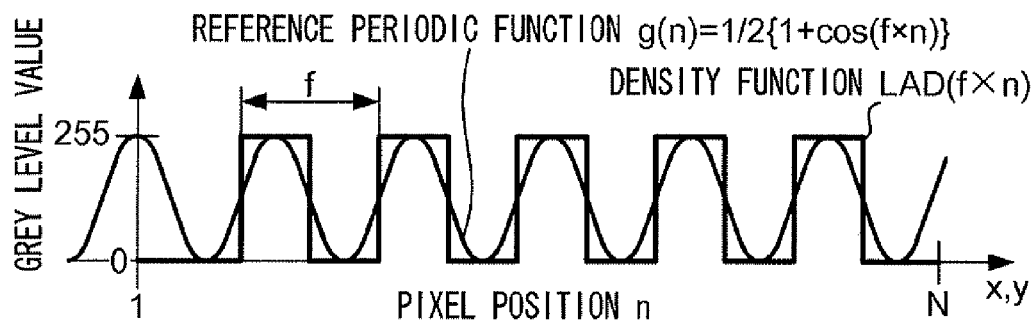
FIG. 8 is a diagram for illustrating a density function in read image data according to the exemplary embodiment.

FIG. 8 is a graph showing an example of a density function LAD(f×n) that is specified according to read image data. In FIG. 8, the horizontal axis indicates the position n of pixels, and the vertical axis indicates the grey level value of pixels. The density function is a function expressing the grey level values of pixels in the area corresponding to the unit images, as shown by, for example, the positions indicated by the broken line arrows in FIGS. 7A and 7B. Note that the reference periodic function shown in FIG. 8 is used in section "(C) Derivation of expression for calculating the misregistration amount" that comes later, and a description of the reference periodic function is not given here.

In the density function LAD(f×n), f is the document angular frequency. In the density function corresponding to the test image T1, document angular frequency f=2πx(in the area corresponding to the unit images, the number of read unit images existing per unit pixel in the y direction). For example, in the test image T1, when the number of ladder pattern unit images existing per unit length (mm) in the slow scanning direction is 1 [line/mm], document angular frequency f=2π1 [line/mm]×25.4 [mm/inch]/200 [dpi]=0.79796 [line/dot]. Division by 200 [dpi] is performed because, by performing division by the reading resolution of the reading unit 600, the density function is defined with the pixel position n being the variable. In the same way, in the density function corresponding to the test image T2, document angular frequency f=2πx (in the area corresponding to the unit images, the number of read unit images existing per unit pixel in the x direction). In the density function LAD(f×n), the grey level value of pixels constituting the read unit images is "255", and the grey level value of other pixels is "0". As shown in FIG. 4, the test images T1 and T2 are formed such that the density periodically changes in the fast scanning direction or the slow scanning direction, and therefore as shown in FIG. 8, the density function LAD(f×n) is considered to be a periodic function in sections corresponding to the read unit images.

Note that hereinafter in the description, the density function corresponding to the ladder pattern P formed using P-colored toner (first colorant) is expressed as $LAD_P(f\times n)$ (first function), and the density function corresponding to a Q-colored test image corresponding to Q-colored toner (second colorant) is expressed as $LAD_Q(f\times n)$ (second function). Also, $LAD_P(f\times n)$ and $LAD_Q(f\times n)$ express the grey level of pixels in a domain set as the area corresponding to the unit images. Accordingly, it is assumed that outside this domain, that is to say, outside the area corresponding to the ladder patterns, the grey level value of pixels is "0".

Figure 9A:
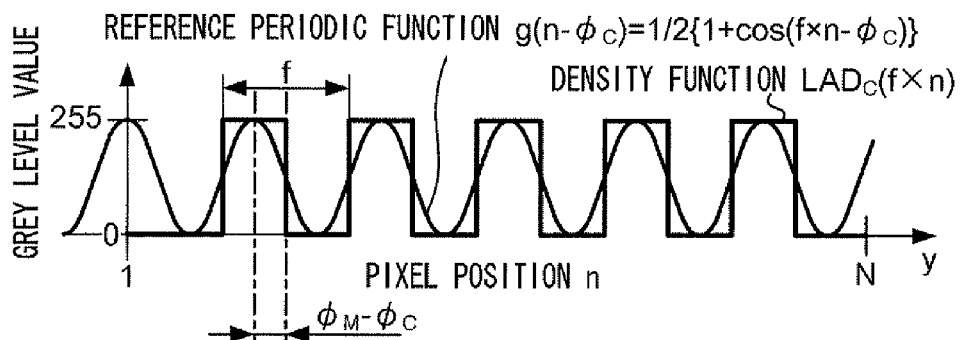
FIGS. 9A and 9B are diagrams for illustrating density functions in read image data according to the exemplary embodiment.
Figure 9B:
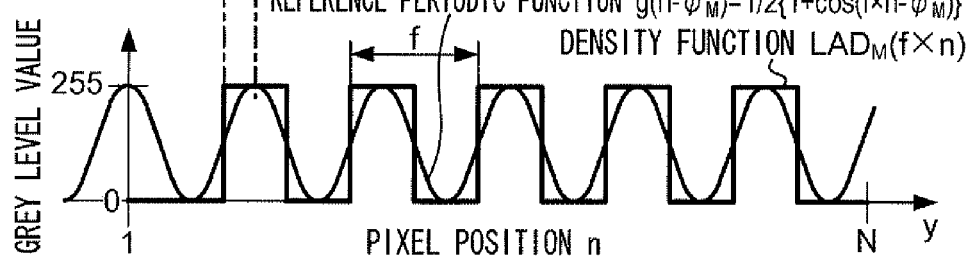

FIGS. 9A and 9B are graphs showing density functions corresponding to the ladder patterns C and M of the test image T1, where the variable is the position in the y direction in the read image data D shown in FIG. 7A. FIG. 9A shows a density function $LAD_C(f\times n)$ corresponding to the ladder pattern C, and FIG. 9B shows a density function $LAD_M(f\times n)$ corresponding to the ladder pattern M. When misregistration in the slow scanning direction occurs between the ladder patterns C and M as shown in FIG. 7A, it is considered that the density function $LAD_C(f\times n)$ and the density function $LAD_M(f\times n)$ will be periodic functions whose phases are shifted by $\phi_M-\phi_C$ as shown in FIGS. 9A and 9B. The phase difference φ is a value that increases along with an increase in the misregistration amount between the images formed using toner C and toner M, and φ=0 when there is no misregistration. The image forming apparatus 10 detects a misregistration amount between different colors of images based on the phase differences φ and the document angular frequencies f.

Returning now to FIG. 6, the following describes the functional structure of the image forming apparatus 10.

The shift amount calculation unit 130 is an example of the shift amount calculation unit of the present invention, and upon receiving a supply of read image data having the above-described characteristics from the read image data acquisition unit 120, the shift amount calculation unit 130 calculates a misregistration amount Δ between images formed using the P-colored toner and the Q-colored toner, based on read image data corresponding to the P color and the Q color test images. The shift amount calculation unit 130 calculates the misregistration amount Δ so as to satisfy the following expression (1) that is derived from a convolution operation for each of the density functions for the P color and the Q color. Note that the procedure for deriving expression (1) is described in the later section "(C) Derivation of expression for calculating the misregistration amount".

$$\Delta = \frac{\tan^{-1}\left\{\frac{\text{Re}P \times \text{Im}Q - \text{Im}P \times \text{Re}Q}{\text{Re}P \times \text{Im}Q + \text{Im}P \times \text{Re}Q}\right\}}{f} \quad (1)$$

Note that in the above expression, $$\text{Re}P = \sum_{n=1}^{N}\{\cos(f \times n) \times LAD_P(f \times n)\}$$

$$\text{Im}P = \sum_{n=1}^{N}\{\sin(f \times n) \times LAD_P(f \times n)\}$$

$$\text{Re}Q = \sum_{n=1}^{N}\{\cos(f \times n) \times LAD_Q(f \times n)\}$$

$$\text{Im}Q = \sum_{n=1}^{N}\{\sin(f \times n) \times LAD_Q(f \times n)\}$$

The shift amount calculation unit 130 calculates the misregistration amount Δ in the fast scanning direction and the slow scanning direction between images formed using the colors C, M, Y, and K by performing the operation according to expression (1) based on the acquired read image data. The shift amount calculation unit 130 supplies the calculated misregistration amounts Δ to the correction unit 150. The correction unit 150 stores the misregistration amounts Δ received from the shift amount calculation unit 130 into a memory.

It should be noted that in the operation according to expression (1), in the case of calculating misregistration amounts Δ based on the ladder patterns formed using the chromatic C, M, and Y toners, the shift amount calculation unit 130 uses read image data for a color component that has been predetermined as being the complimentary color of the corresponding color of toner Here, the complimentary color relationship between the toner color and the color component of the read image data is as follows: yellow (Y) and blue (B), magenta (M) and green (G), and cyan (C) and red (R). This is predetermined at the design stage or the like. The read image data for the color component that is the complimentary color of the toner color may be used because this improves the accuracy of reading the test image and ensures the accuracy of detecting a misregistration amount Δ. On the other hand, for a test image formed using the achromatic black (K) toner, read image data for any of the R, G, and B color components may be used, but in this exemplary case, red (R) read image data is used.

The conversion unit 140 acquires image data that has been received by the communication unit 400 from the external apparatus 1000, and thereafter performs rasterization processing and color space conversion processing on the image data to convert the image data to raster-format image data in the CMYK color space, and supplies the converted image data to the correction unit 150. Note that in the case of acquiring image data expressed in the CMYK color space, the conversion unit 140 supplies the image data as is to the correction unit 150.

The correction unit 150 corrects misregistration in images based on misregistration amounts Δ calculated by the shift amount calculation unit 130. This correction can be achieved by employing a known method for correcting the image forming position of the image forming unit 200. In one example, the correction unit 150 manipulates image data from the conversion unit 140 by, for example, electrically adjusting the electrical circuitry and signal system of the exposing device 230, such as adjusting the exposure intensity and exposure position of the exposing device 230.

The image formation controller 160 supplies the image data received from the correction unit 150 to the image forming unit 200, and causes an image in which image misregistration has been corrected to be formed on a recording sheet in accordance with the supplied image data.

(B) Operations

The image forming apparatus 10 operates in either of two operation modes, namely "normal mode" or "correction mode". When in "normal mode", the image forming apparatus 10 forms an image onto a recording sheet in accordance with image data received via the communication unit 400, based on an instruction from a user. In "correction mode", the image forming apparatus 10 performs operations for calculating a misregistration amount Δ.

When the image forming apparatus 10 is operating in the normal mode, upon acquiring image data via the communication unit 400, the controller 100 converts the color space of the image data to the CMYK color space, and based on a misregistration amount Δ stored in the memory of the controller 100, corrects the image forming position in the fast scanning direction and the slow scanning direction, and causes the image forming unit 200 to form an image on a recording sheet with use of the C, M, Y, and K toner.

When the image forming apparatus 10 is operating in the correction mode, the controller 100 supplies test image data to the image forming unit 200, and causes the image forming unit 200 to form the test image T onto a recording sheet. The controller 100 then reads the recording sheet with use of the reading unit 600 and generates read image data, and based on the read image data, performs the operation of expression (1) to calculate a misregistration amount Δ between different colors. The controller 100 then stores the calculated misregistration amount Δ in the memory.

The operation mode of the image forming apparatus 10 may be switched in accordance with a user instruction performed via the operation unit 300, or may be switched at a predetermined cycle.

(C) Derivation of Expression for Calculating the Misregistration Amount Δ

The following describes a procedure for deriving the expression for calculating the misregistration amount Δ, shown in expression (1). Note that although a procedure for deriving a misregistration amount Δ in the x direction based on the test image T2 is described below, a procedure for deriving a misregistration amount in the y direction is the same procedure if the test image T1 is used and "x" is replaced with "y" in the below description.

The inventors of the present invention supposed that, using the fact that the density function LAD(f×x), in which a position in the x direction is expressed as x, is considered to be a periodic function in the area (domain) corresponding to unit images, a misregistration amount (amount of color shift) can be calculated based on the document angular frequencies of and phase difference between density functions for different colors. In view of this, first, a reference periodic function $g(x-\phi)$ is set as a function that has the same frequency as the density function LAD(f×x) and expresses a sine wave whose amplitude is always a value greater than or equal to 0, and is a value of "1" in this case. Specifically, this function is expressed as $g(x-\phi)=1/2\{1+\cos(f\times x-\phi)\}$. FIG. 8 shows the characteristics of the reference periodic function $g(x)$ when $\phi=0$. Here, when a convolution operation is performed on the density function LAD(f×x) and the reference periodic function $g(x-\phi)$, expression (2) is derived.

$$\int_{x1}^{x2}\left[\frac{1}{2}\times\{1+\cos(f\times x-\phi)\}\times LAD(f\times x)\right]dx \cong \qquad (2)$$

$$\frac{1}{2}\times\sum_{n=1}^{N}[\{1+\cos(f\times n-\phi)\}\times LAD(f\times n)]$$

The left side of expression (2) means that a convolution operation is performed in which the domain is a section corresponding to the range x=x1 to x2 in the read image data. When this domain is converted so as to be expressed using a position n in the x direction, and the domain is a section corresponding to the range n=1 to N, the right side of the expression (2) is derived.

Upon obtaining $\phi$ at which the result of performing the convolution operation shown in the right side of expression (2) is the maximum value, a misregistration amount Δ between different toners is obtained by comparing $\phi$ corresponding to different colors of ladder patterns. Here, $\phi=\phi_0$ is assumed to be the value of $\phi$ at which the result of performing the convolution operation on the reference periodic function $g(n-\phi)$ and the density function LAD(f×n) is the maximum value. In this case, when $\phi=\phi_0$, the density function LAD(f×n) and the reference periodic function $g(n-\phi_0)$ are in the same phase. In view of this, when the phase difference $\phi$ is obtained for different colors of ladder patterns, a misregistration amount Δ between different colors of images is calculated in accordance with the difference between these phase differences $\phi$. In the examples shown in FIGS. 9A and 9B, a misregistration amount Δ is calculated in accordance with the phase difference $\phi=\phi_M-\phi_C$.

Here, the condition under which the right side of expression (2) yields a maximum value is that expression (3) yields a maximum value.

$$\sum_{n=1}^{N}\{\cos(f\times n-\phi)\times LAD(f\times n)\} \qquad (3)$$

Expression (4) is obtained by transforming expression (3).

$$\sum_{n=1}^{N}\{\cos(f\times n-\phi)\times LAD(f\times n)\} = \text{Re}\left[\sum_{n=1}^{N}\{e^{i(f\times n-\phi)}\times LAD(f\times n)\}\right] \qquad (4)$$

$$= \text{Re}\left[e^{-i\phi}\times\sum_{n=1}^{N}\{e^{i(f\times n)}\times LAD(f\times n)\}\right]$$

$$= \text{Re}\left[e^{-i\phi}\times a\times e^{ib}\right]$$

$$= a\times\text{Re}[e^{i(b-\phi)}]$$

$$= a\times\cos(b-\phi)$$

In expression (4), both a and b are positive values. According to expression (4), the condition under which expression (3) yields a maximum value is that b=ϕ. Here, based on expression (4), when the ratio of the real part to the imaginary part of the two sides of expression (5) is obtained, expression (6) is derived.

$$\sum_{n=1}^{N} \{e^{i(f \times n)} \times LAD(f \times n)\} = a \times e^{ib} \quad (5)$$

$$\frac{\sum_{n=1}^{N} \{\sin(f \times n) \times LAD(f \times n)\}}{\sum_{n=1}^{N} \{\cos(f \times n) \times LAD(f \times n)\}} = \frac{\sin b}{\cos b} = \tan b \quad (6)$$

As described above, since b=ϕ is the condition under which expression (3) yields a maximum value, the condition under which expression (2) yields a maximum value is that the relationship of expression (7) is satisfied.

$$\phi = b = \tan^{-1}\left[\frac{\sum_{n=1}^{N} \{\sin(f \times n) \times LAD(f \times n)\}}{\sum_{n=1}^{N} \{\cos(f \times n) \times LAD(f \times n)\}}\right] \quad (7)$$

Using a position specified by the reference periodic function g(n) as a reference, a misregistration amount Δ of a ladder pattern from that position satisfies expression (8) using the phase difference ϕ.

$$\Delta = \frac{\phi}{f} \quad (8)$$

Next is a description of a procedure for calculating a misregistration amount Δ between images formed using the P-colored and the Q-colored toner. The phase shift amount between the P color ladder pattern and the Q color ladder pattern is ($b_P - b_Q$). Note that $b_P$ is the value of b corresponding to the P color, and $b_Q$ is the value of b corresponding to the Q color. Here, expressions (9) and (10) are derived when expression (5) is expressed for the P color and the Q color respectively.

$$\sum_{n=1}^{N} \{e^{i(f \times n)} \times LAD_P(f \times n)\} = a_P \times e^{ib_P} \quad (9)$$

$$\sum_{n=1}^{N} \{e^{i(f \times n)} \times LAD_Q(f \times n)\} = a_Q \times e^{ib_Q} \quad (10)$$

Here, expression (11) is derived when the ratio between expressions (9) and (10) is obtained. In expression (11), $a_P$ is the value of a corresponding to the P color, and $a_Q$ is the value of a corresponding to the Q color.

$$\frac{\sum_{n=1}^{N} \{e^{i(f \times n)} \times LAD_P(f \times n)\}}{\sum_{n=1}^{N} \{e^{i(f \times n)} \times LAD_Q(f \times n)\}} = \frac{a_P \times e^{ib_P}}{a_Q \times e^{ib_Q}} = \frac{a_P}{a_Q} \times e^{i(b_P - b_Q)} \quad (11)$$

Then, in accordance when the derivation procedure from expression (5) to expression (7), expression (12) is obtained when the ratio of the real part to the imaginary part of the two sides of expression (11) is obtained.

$$b_P - b_Q = \tan^{-1}\left\{\frac{\text{Re}P \times \text{Im}Q - \text{Im}P \times \text{Re}Q}{\text{Re}P \times \text{Im}Q + \text{Im}P \times \text{Re}Q}\right\} \quad (12)$$

Note that in the above expression (12), $$\text{Re}P = \sum_{n=1}^{N} \{\cos(f \times n) \times LAD_P(f \times n)\}$$

$$\text{Im}P = \sum_{n=1}^{N} \{\sin(f \times n) \times LAD_P(f \times n)\}$$

$$\text{Re}Q = \sum_{n=1}^{N} \{\cos(f \times n) \times LAD_Q(f \times n)\}$$

$$\text{Im}Q = \sum_{n=1}^{N} \{\sin(f \times n) \times LAD_Q(f \times n)\}$$

Therefore, according to expression (12), the misregistration amount Δ (color shift amount) between the colors P and Q satisfies the following expression (13).

$$\Delta = \frac{(b_P - b_Q)}{f} = \frac{\tan^{-1}\left\{\frac{\text{Re}P \times \text{Im}Q - \text{Im}P \times \text{Re}Q}{\text{Re}P \times \text{Im}Q + \text{Im}P \times \text{Re}Q}\right\}}{f} \quad (13)$$

This completes the description regarding the derivation of the expression for calculating the misregistration amount Δ.

In this way, based on a convolution operation performed on density functions obtained by reading different colors of ladder patterns, the image forming apparatus 10 calculates a misregistration amount Δ in accordance with the phase differences between and the document angular frequencies of the density functions.

According to the exemplary embodiment described above, the image forming apparatus 10 forms multiple unit images having a predetermined size in a first direction with use of a single toner, with a given distance d therebetween in the first direction. The image forming apparatus 10 acquires read image data generated by the reading unit 600, and based on the acquired read image data, performs the operation shown in expression (1) with use of density functions specified from the ladder patterns, thus calculating a misregistration amount Δ between different colors of images. In this way, since the density functions are considered to be periodic functions in the area corresponding to the read unit images, according to this aspect of the present invention, a misregistration amount can be calculated using a simple operation algorithm, that is to say, the convolution operation. Also, the ladder pattern is, for example, 1 [line/mm], and in this case if the reading resolution of the reading unit 600 is, for example, 200 [dpi], the reading accuracy is sufficient. In this way, according to this aspect of the present invention, since there is no need to raise the reading resolution in order to ensure accurate misregistration detection, the number of operations for performing detection can be reduced without causing a decrease in the accuracy of detecting misregistration in an image.

(D) Exemplary Variations

The present invention can be embodied in a form different from the exemplary embodiment described above. The exemplary variations described below can be combined in various ways.

(D-1) Exemplary Variation 1

Although the example in which the controller 100 is included in the image forming apparatus 10 is described in the above exemplary embodiment, the controller 100 is not limited to being included in the image forming apparatus 10. For example, the controller 100 may be realized by a computer apparatus connected to the image forming apparatus via a communication unit such as a USB (Universal Serial Bus) cable or a LAN (Local Area Network). In this case, it is sufficient for the computer apparatus to realize at least the functions of a test image formation controller that causes an external image forming apparatus (the image forming unit) to form the test image T, a read image data acquisition unit that acquires read image data generated by an external reading device (the reading unit), and a shift amount calculation unit that calculates a misregistration amount $\Delta$ between images based on a convolution operation performed using the read image data. In this case, the computer apparatus may output the calculated misregistration amount $\Delta$ to the image forming apparatus that uses the misregistration amount $\Delta$ in misregistration correction, or may obtain a correction amount based on the misregistration amount $\Delta$ and output the correction amount.

(D-2) Exemplary Variation 2

Although the image forming apparatus 10 corrects a misregistration between images formed using different toner in the exemplary embodiment described above, the image forming apparatus 10 may detect a chromatic aberration of magnification that occurs when the reading unit 600 reads an image, with use of the calculation described above.

The following briefly describes chromatic aberration of magnification.

Figure 10:
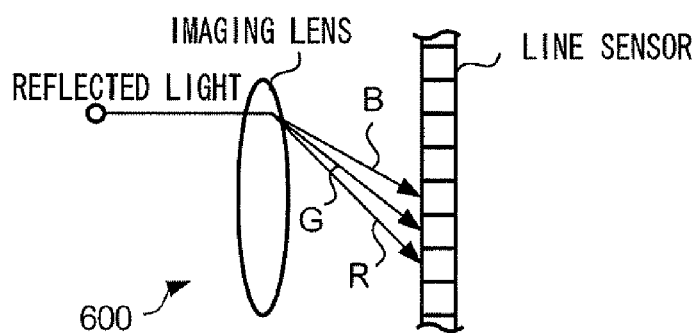
FIG. 10 is a diagram showing optical paths of color components of light in the reading unit.

FIG. 10 is a diagram showing a positional relationship between an imaging lens and a line sensor in the reading unit 600, and an optical path of color components of light (reflected light from a recording sheet) in the case of reading a recording sheet. As shown in FIG. 10, reflected light from the recording sheet enters the imaging lens of the reading unit 600, is refracted at a refraction rate in accordance with the wavelength of the light, and proceeds in the direction of the line sensor. Since the color components of light corresponding to R, G, and B have different wavelengths, the refraction rate when passing through the imaging lens is different. Accordingly, as shown in FIG. 10, since the focal distance is different for each color component of reflected light, the color components of reflected light arrive at different positions on the line sensor even if they have come from the same position on the recording sheet surface. As a result, the image magnification is different between read image data for different color components, and the image size is different between different color components.

To address this issue, in the present exemplary variation, the image forming apparatus 10 detects a chromatic aberration of magnification using the ladder pattern K formed using the achromatic black (K) toner. Next is a description of a procedure for detecting a chromatic aberration of magnification.

The controller 100 causes the reading unit 600 to read the test image T including the ladder pattern K, and thereafter acquires read image data for the R, G, and B color components. Then, based on read unit images corresponding to the ladder pattern K, the controller 100 calculates a misregistration amount between images formed from different color components. At this time, in the operation of expression (1), the controller 100 applies the density function corresponding to the P color to the density function (first function) in the read image data for the first color component obtained by reading the color K ladder pattern, applies the density function corresponding to the Q color to the density function (second function) in the read image data for the second color component obtained by reading the color K ladder pattern, and calculates the misregistration amount between the images formed from the different color components. Here, the first and second color components are a combination of different color components among the R, G, and B color components, and the misregistration amount between images formed from these color components is calculated. Then, the controller 100 detects a chromatic aberration of magnification based on the misregistration amount between the images formed from different color components. If a misregistration occurs between images formed from different color components in the read image data even though the images are read using the same ladder pattern K as the target, this means that the magnification between images formed from different colors is different due to a chromatic aberration of magnification. Upon detecting that a chromatic aberration of magnification has occurred, the controller 100 performs correction for resolving the chromatic aberration of magnification so that the size and position of images formed from different color components match. A known technique can be used to perform the correction.

Note that this configuration is not limited to black (K) toner. A ladder pattern formed using gray or white achromatic toner may be used, but it is necessary to use a color of toner that is different from the color of the recording sheet surface. Also, "achromatic color" as used here is not limited to a color completely lacking chromaticity. This term also includes colors that mostly lack chromaticity. In other words, even colors that have a slight amount of chromaticity can be conceptually recognized as being an achromatic color.

(D-3) Exemplary Variation 3

Figure 11:
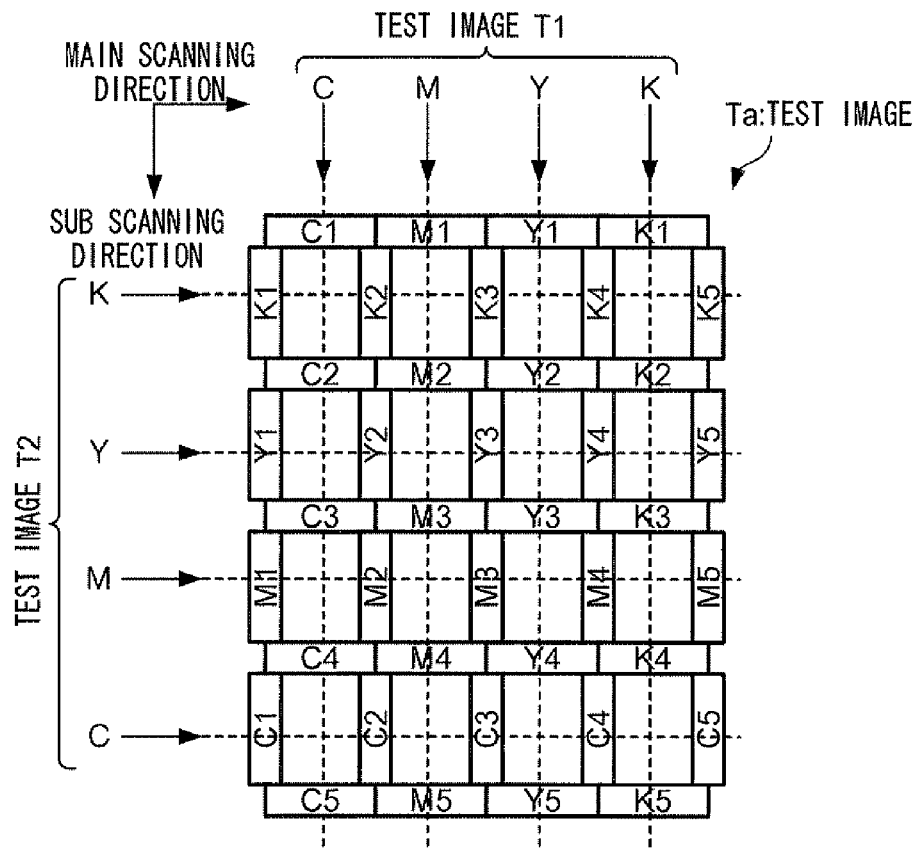
FIG. 11 is a diagram showing test images according to an exemplary variation.

A test image Ta shown in FIG. 11 is an example of a test image that may be used in place of the test image T in the exemplary embodiment described above. The test image Ta has a configuration equivalent to a configuration obtained by integrating the test images T1 and T2 shown in FIG. 4. Specifically, in the test image Ta, the unit images are arranged so that the test images T1 and T2 form a lattice. Even in the case of using the test image Ta, a misregistration amount $\Delta$ can be calculated using the same procedure as in the above exemplary embodiment if for example, density functions for the directions of the arrows shown in FIG. 11 are used.

The configuration of the test image is not limited to the configurations described above. Since the image forming apparatus 10 calculates a misregistration amount $\Delta$ based on document angular frequencies of and phase differences between density functions specified from read image data, the test image can be any image whose density changes periodically and that is formed at a position at which the phase differences between density functions obtained from multiple ladder patterns is uniquely specified. Accordingly, it is possible to use, for example, a test image in which unit images of different ladder patterns are arranged in a line in the fast scanning direction or the slow scanning direction. In this case as well, the formation positions of the ladder patterns are shifted from a given position if misregistration has occurred, and therefore a phase difference occurs between the density functions in accordance with the misregistration amount.

Figure 12:
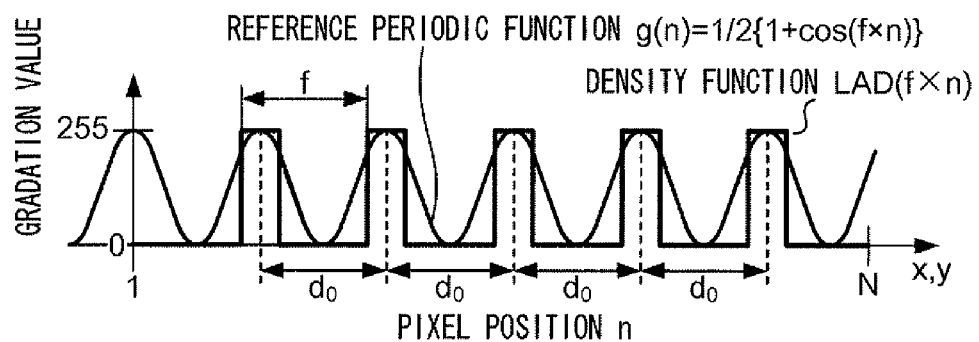
FIG. 12 is a diagram for illustrating a density function in read image data according to the exemplary variation.

Although L=d in the exemplary embodiment described above, the case in which L≠d is also possible. FIG. 12 is a graph showing a density function in the case in which L≠d (here, L<d). This is because even if the length L of unit images in the width direction is less than the distance d, the result of the convolution operation of expression (2) is the maximum value when the vertexes of the reference periodic function $g(n-\phi)$ match the centers of the read unit images in the width direction. For the same reason, the case in which L>d is possible. In this way, even if L≠d, a misregistration amount Δ can be calculated using the operation of expression (1) without influencing the calculation of the phase differences ϕ. In other words, as shown in FIG. 12, it is sufficient to use a ladder pattern including unit images in which the central positions in the width direction are separated at a constant distance $d_0$. Also, it can be said that due to the above, the line width L and distance d of the unit images may be different for each ladder pattern.

There is no need for the unit images to be line-segment images. It is sufficient for the unit images to have a given size in at least the arrangement direction. Also, the unit images do not need to be solid images. The unit images may be an image having a lower density than a solid image, or may be an image in which, for example, the density transitions sinusoidally in the width direction. Also, the number of test images T and positions at which the test image T is arranged on the recording sheet are not limited to the number and positions of the exemplary embodiment described above. Also, the number of unit images included in a ladder pattern is not limited to "5". It is sufficient to form at least more than one unit image.

(D-4) Exemplary Variation 4

Although the reading unit 600 generates read image data expressed in the RGB color space in the exemplary embodiment described above, another color space may be used. In this configuration as well, if the colors of toner used in the ladder patterns are chromatic colors, read image data may be generated with color components predetermined as complimentary colors of the chromatic colors. Also, the toner colors may be other colors such as orange and blue, and the image forming unit 200 may form images using 3 toner colors or less, or 5 toner colors or more.

Also, although the image forming unit 200 forms images using an electrophotographic method, another method such as an inkjet method may be used. In other words, the colorant is not limited to being toner. Another colorant such as ink may be used.

Also, the image forming apparatus 10 may be configured so that the reading unit 600 reads a test image formed on a recording sheet, however, this does not exclude a configuration in which, for example, a test image is read from another medium (recording medium) such as the intermediate transfer belt 250 or the photosensitive drums 210. Also, in place of a recording sheet, another material such as plastic (e.g., an OHP sheet) may be used. It is sufficient to use any medium that is able to have an image recorded on the surface thereof In other words, the recording sheet is an example of a recording medium on which an image can be recorded.

(D-5) Exemplary Variation 5

Also, the image forming apparatus 10 may calculate a misregistration amount Δ in either the fast scanning direction or the slow scanning direction, and in this case, it is sufficient to form the corresponding one of the test images T1 and T2. Also, the image forming apparatus 10 is not limited to calculating a misregistration amount in the fast scanning direction or the slow scanning direction. If unit images are arranged under the above conditions in a given first direction, the image forming apparatus 10 may calculate a misregistration amount between images in the first direction.

Also, another type of reading device such as a scanner may be used in place of the reading unit 600. In this case, when the test image has been formed by the image forming unit 200, the user sets the recording sheet in the scanner and causes the scanner to read the recording sheet, and the scanner generates read image data and outputs the read image data to the controller 100.

(D-6) Exemplary Variation 6

Although the image forming apparatus 10 generates read image data in which each piece of pixel data expresses one of 256 grey level values in the exemplary embodiment described above, a misregistration amount Δ can be calculated using the operation of expression (1) as long as the density functions are defined as periodic functions. Accordingly, it is sufficient for the read image data to include grey level values whose difference is sufficient to enable distinguishing between a read unit image and a space between read unit images. Accordingly, the operation of expression (1) may be performed if, for example, the grey level value of pixels constituting a read unit image is "1", and the grey level value of other pixels is "0". Also, although the grey level value of pixels constituting a read unit image is high, and the grey level value of others pixel is low at "0", in the above configuration, the opposite is also possible. Even in this case, if the reference periodic function is set such that the result of the convolution operation is maximal when the density function and reference period function shown in FIG. 8 are in the same phase, expression (1) can be derived by the procedure described in "(C) Derivation of expression for calculating the misregistration amount Δ".

(D-7) Exemplary Variation 7

In the exemplary embodiment described above, the image forming apparatus 10 calculates a misregistration amount Δ between images formed using different toner by comparing phase differences ϕ obtained from different colors of ladder patterns. In contrast, a configuration is possible in which the image forming apparatus 10 calculates a misregistration amount from a reference position. As described above, since a misregistration amount is calculated in accordance with the magnitude of the phase difference ϕ between the density function and the reference periodic function g(x) when ϕ=0, if it is assumed that there is a ladder pattern that is in the same phase as the reference periodic function g(x) and has the same document angular frequency, a misregistration amount from the position of this ladder pattern used as a reference can be calculated using expression (8). In other words, when ϕ=0, a position specified by the density function LAD(f×n) at which the result of the convolution operation of expression (2) is maximal corresponds to the reference position. In this way, if the reference periodic function ϕ(n) is set in accordance with the reference position, the image forming apparatus 10 calculates a misregistration amount Δ from the reference position using the operation of expression (8) that is based on the convolution operation.

In this way, the present invention includes not only a configuration in which an apparatus for forming multiple colors of images calculates a relative misregistration between different colored images, but also a configuration in which an absolute misregistration from a reference position is calculated. Accordingly, the present invention may also be applied to an image forming apparatus that forms single-colored images. The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a controller that causes an image forming unit to form an image so that a plurality of unit images are arranged in a first direction with a constant distance between adjacent unit images;
an acquisition unit that acquires read image data indicating a position and a grey level value of each pixel constituting the image formed under control of the controller; and
a calculation unit that calculates a misregistration with respect to the first direction of the image formed by the image forming unit, based on a convolution operation performed on the read image data acquired by the acquisition unit, the convolution operation using a reference periodic function whose variable is a position in the first direction in which the plurality of unit images are arranged.

2. The image processing apparatus according to claim 1, wherein the image forming unit forms the plurality of unit images with use of at least a first colorant and a second colorant that is different from the first colorant, and
the calculation unit calculates a relative misregistration amount with respect to the first direction between a unit image formed using the first colorant and a unit image formed using the second colorant, based on a convolution operation performed on first read image data corresponding to the plurality of unit images formed using the first colorant and on second read image data corresponding to the plurality of unit images formed using the second colorant, the convolution operation using a first reference periodic function with respect to the first read image data and a second reference period function with respect to the second read image data.

3. The image processing apparatus according to claim 2, wherein the calculation unit calculates the misregistration amount $\Delta$ so as to satisfy the following expressions derived from the convolution operation:

$$\Delta = \frac{\tan^{-1}\left\{\frac{ReP \times ImQ - ImP \times ReQ}{ReP \times ImQ + ImP \times ReQ}\right\}}{f}$$

$$ReP = \sum_{n=1}^{N} \{\cos(f \times n) \times LAD_P(f \times n)\}$$

$$ImP = \sum_{n=1}^{N} \{\sin(f \times n) \times LAD_P(f \times n)\}$$

$$ReQ = \sum_{n=1}^{N} \{\cos(f \times n) \times LAD_Q(f \times n)\}$$

$$ImQ = \sum_{n=1}^{N} \{\sin(f \times n) \times LAD_Q(f \times n)\}$$

where $f = 2\pi \times$(the number of unit images existing per unit pixel with respect to the first direction),
n being a natural number, and being a value expressing the position of a unit image with respect to the first direction,
N being a natural number, and being the total number of unit images existing in the first direction, and
$LAD_P(f \times n)$ being the first read image data, and $LAD_Q(f \times n)$ being the second read image data.

4. The image processing apparatus according to claim 1, wherein the image forming unit forms the unit images using a chromatic colorant,
a grey level value included in the read image data acquired by the acquisition unit includes a complimentary color component that is a complimentary color of the chromatic color, and
the calculation unit calculates a misregistration amount of an image formed using the chromatic colorant, based on read image data corresponding to the complimentary color component.

5. The image processing apparatus according to claim 2, wherein at least one of the first colorant and the second colorant is a substantially achromatic colorant.

6. The image processing apparatus according to claim 1, wherein among the plurality of unit images, the image forming unit forms a plurality of unit images in the first direction and a plurality of unit images in a second direction that is orthogonal to the first direction, and
the calculation unit calculates a misregistration amount with respect to each of the first direction and the second direction.

7. The image processing apparatus according to claim 1, further comprising:
a correction unit that corrects a misregistration in an image to be formed by the image forming unit, based on a misregistration amount calculated by the calculation unit.

8. An image forming apparatus comprising:
an input unit that receives an input of image data;
an image forming unit that forms an image;
a controller that causes the image forming unit to form an image so that a plurality of unit images are arranged in a first direction with a constant distance between adjacent unit images;
a reading unit that reads the plurality of unit images formed by the image forming unit and generates read image data expressing a position and a grey level value of each pixel constituting the read images;
a calculation unit that calculates a misregistration with respect to the first direction of the image formed by the image forming unit, based on a convolution operation performed on the read image data, the convolution operation using a periodic function whose variable is a position in the first direction in which the plurality of unit images are arranged; and
a correction unit that, based on a misregistration amount calculated by the calculation unit, corrects a misregistration in an image to be formed based on image data input from the input unit.

* * * * *